Nov. 30, 1965  A. STEINGRUEBNER  3,220,055
APPARATUS FOR MAKING INTERLOCKING ZIPPER ELEMENTS
Original Filed Aug. 4, 1959  3 Sheets-Sheet 1
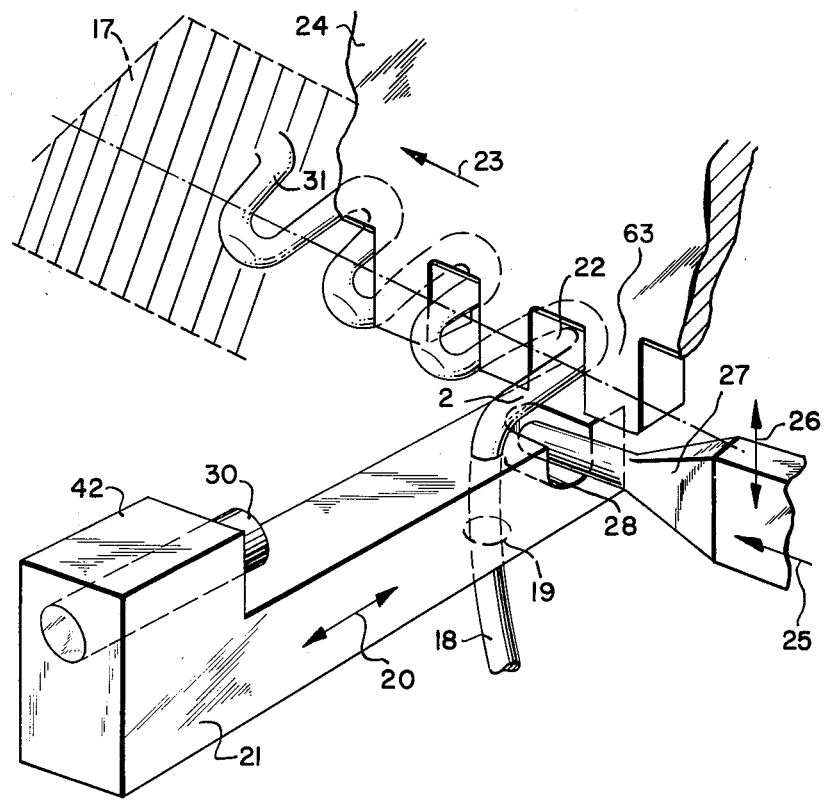
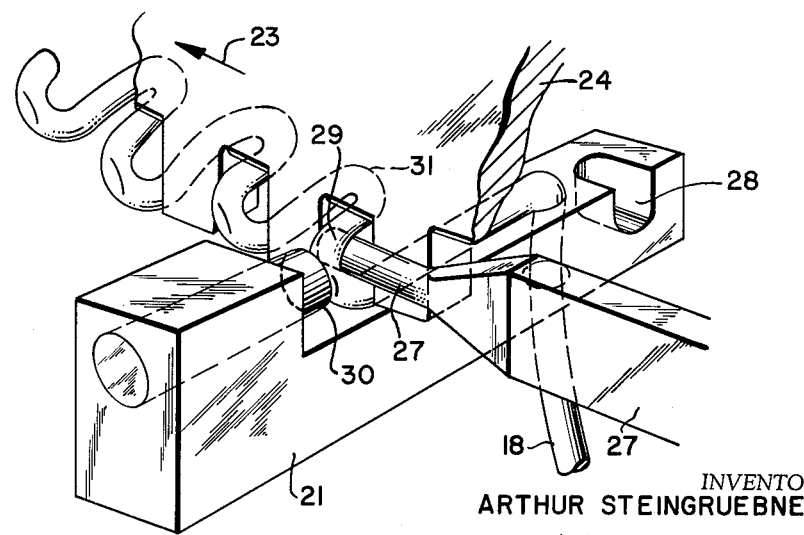
INVENTOR.
ARTHUR STEINGRUEBNER
BY Kelman and Berman
AGENTS

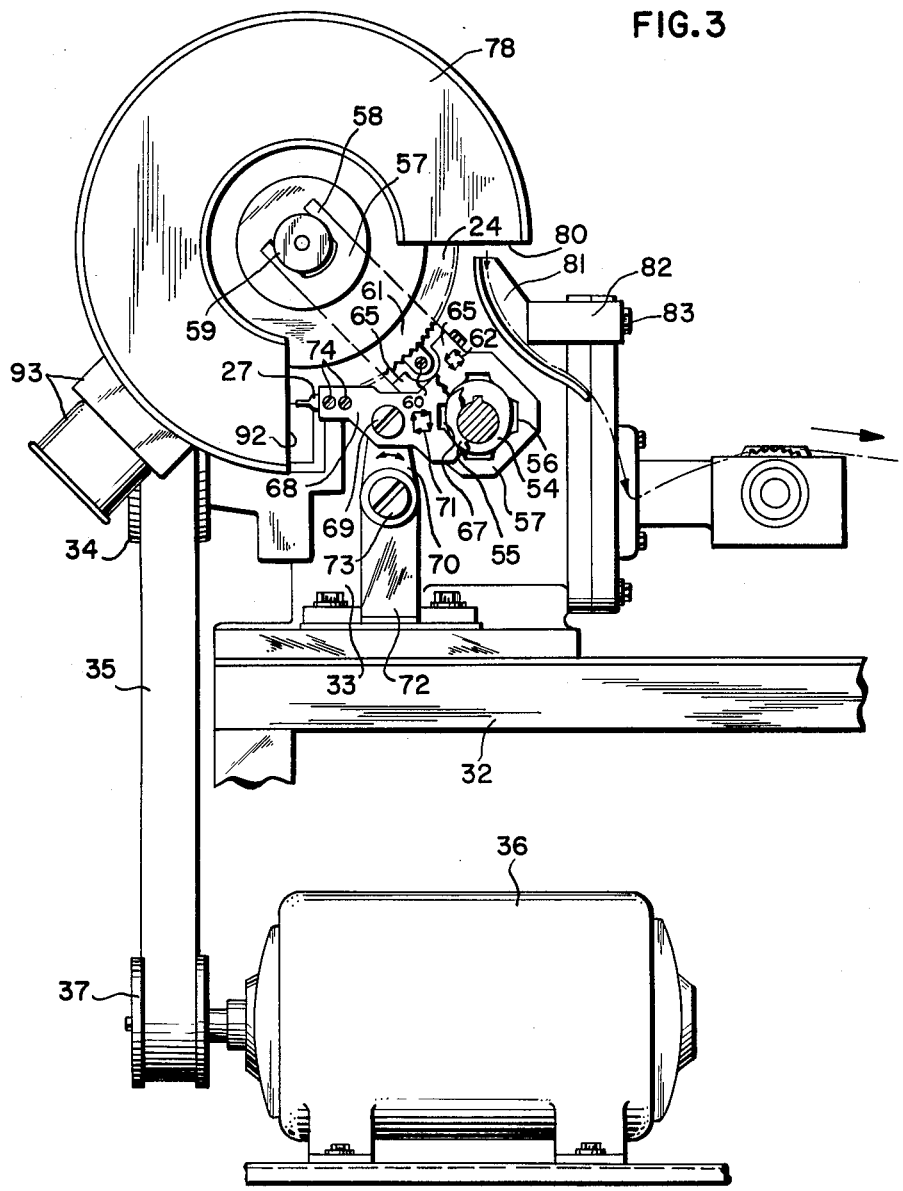

Nov. 30, 1965  A. STEINGRUEBNER  3,220,055
APPARATUS FOR MAKING INTERLOCKING ZIPPER ELEMENTS
Original Filed Aug. 4, 1959  3 Sheets-Sheet 3

INVENTOR.
ARTHUR STEINGRUEBNER
BY *Kelman and Berman*

AGENTS

United States Patent Office 3,220,055
Patented Nov. 30, 1965

3,220,055
APPARATUS FOR MAKING INTERLOCKING
ZIPPER ELEMENTS
Arthur Steingruebner, Bonn (Rhine), Germany, assignor, by mesne assignments, to Wahl Brothers, New York, N.Y., a partnership
Original application Aug. 4, 1959, Ser. No. 831,628, now Patent No. 3,128,518, dated Apr. 14, 1964. Divided and this application Mar. 18, 1963, Ser. No. 274,886
Claims priority, application Germany, Aug. 7, 1958, B 49,888
6 Claims. (Cl. 18—1)

The present invention relates to apparatus for manufacturing interlocking zipper elements of the type disclosed in my copending application Serial No. 831,628, filed August 4, 1959, now Patent Number 3,128,518, granted April 14, 1964 of which the instant application is a division.

It is an object of the present invention to provide an apparatus for producing such zipper elements from wires or threads of any cross sectional shape and particularly from round wires.

It is another object of the present invention to provide an apparatus for producing zipper elements of plastic material.

The interlocking zipper elements are preferably manufactured from pre-stretched polyamide, polyurethane or polyester wire.

For manufacturing zipper elements in continuous operation on the apparatus of the present invention, which will be described hereinafter, the wire is introduced into the apparatus on one side, passed therethrough and a fastener element withdrawn from the other side. According to the method of the present invention, the wire is continuously introduced perpendicularly to a reference plane which corresponds to a plane common to the two zipper halves in the assembled condition of the zipper. The wire is bent parallel to said plane. It is then folded to form a leg and bent back over a pin, whereupon it is folded to form a second leg and bent off to form a foot portion. Thereupon the wire is led to the next interlocking member in the aforementioned plane or approximately parallel to it. During the afore-described principal shaping operation of the individual members of the interlocking elements, an interlocking head is formed on each member.

The plastic material of the freshly formed zipper element is stabilized by being guided through a heating zone immediately after having been formed.

It is preferred simultaneously to manufacture two continuous zipper elements, and to withdraw them from the apparatus together in continuous operation.

The invention furthermore is concerned with apparatus for performing the afore-described method. The apparatus includes a shaping wheel equipped with an indexing drive for rotation in a plane perpendicular to the afore-mentioned reference plane, and parallel to the longitudinal axis of the zipper. The shaping wheel has a toothed rim, and the individual members of the zipper element are shaped in the gaps between the teeth of the shaping wheel rim. Radially adjacent the toothed rim of this wheel there is provided a wire or thread guide which reciprocates in an approximately axial path. It cooperates with a mandrel pin which is elongated in a tangential direction, and reciprocally moves both tangentially and radially toward and away from said rim. The wheel, the thread or wire guide, and the mandrel pin cooperate to shape the plastic wire or thread into continuous zipper elements ready for sewing on tape.

According to another feature of the device of the invention, the thread guide is equipped with a die for forming an interlocking head on each member simultaneously with the afore-described shaping steps.

For producing two intermeshing zipper elements in one working process, the apparatus according to the present invention may be provided with two or more shaping wheels mounted on a common shaft and cooperating with a common thread guide, a mandrel pin being associated with each of the wheels.

The invention will be more fully appreciated upon consideration of the following detailed description of a preferred embodiment relating to the accompanying drawings, wherein:

FIGS. 1 and 2 illustrate the method of the present invention;

FIG. 3 is a side elevational, partly sectional view of an apparatus according to the present invention;

Figure 4:
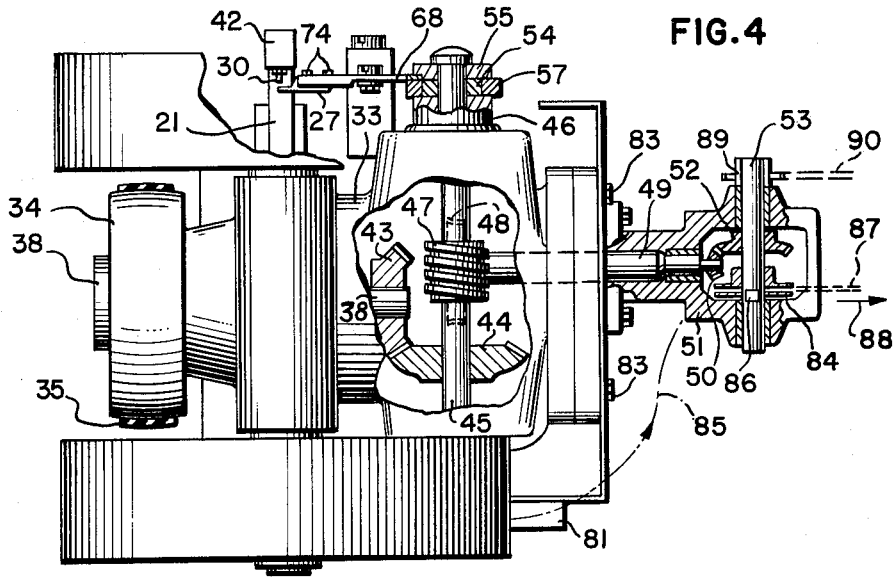
FIG. 4 is a fragmentary, partly sectional plan view of the device of FIG. 3.

The apparatus of the invention will first be described with reference to FIGS. 3 through 5 of the drawings. On a machine frame 32 there is mounted a gear box 33 the input shaft 38 of which carries a pulley 34 driven by a belt 35 trained over the drive pulley 37 of an electric motor 36. The pulley 34 is connected by the shaft 38 with a cam disk 39, best seen in FIG. 5. The disk 39 rotates in a recess 40 of a thread guide 21 suitably shaped for actuating reciprocating movement of the guide 21 on bearings 41 in the direction of the arrow 20 transversely of the shaft 38. The two heads 42 of the thread guide 21 which are laterally spaced from the shaft 38 in a symmetrical manner, and of which only one is visible in FIGS. 4 and 5, each carry one of two dies 30 which face inwardly toward the shaft 38.

On the end of the shaft 38 remote from the pulley 34 there is mounted a bevel gear wheel 43 (see FIG. 4), which meshes with a bevel gear wheel 44 on a transverse shaft 45. The transverse shaft 45 is supported in the gear box 33 on bearing 46, and carries a worm 47 in the interior of the box. This worm cooperates with a wormwheel 48. The wheel 48 is shown in FIG. 4 in dashdotted lines, since it is located below the transverse shaft 45.

The worm wheel is mounted on a shaft 49 which is rotatably supported in a bearing 51 of the gear box. A bevel gear 50 is secured to the free end of the shaft 49 for engagement with a bevel gear 52 on a shaft 53. The two ends of the transverse shaft 45 project from the gear box 33 at opposite sides thereof, and each carry two cam disks 54 and 55. The cam disk 54 rotates in a recess 56 of a feed arm 57 the free forked end 58 of which straddles a transverse shaft 59, and is thereby longitudinally slidable on the shaft which is arranged above the shaft 45.

When driven by the cam disk 54, the feed arm 57 moves to actuate a pawl 61, which is pivotally mounted on a pin 60. The cyclic movement of the feed lever is indicated by the arrows 62.

Figure 5:
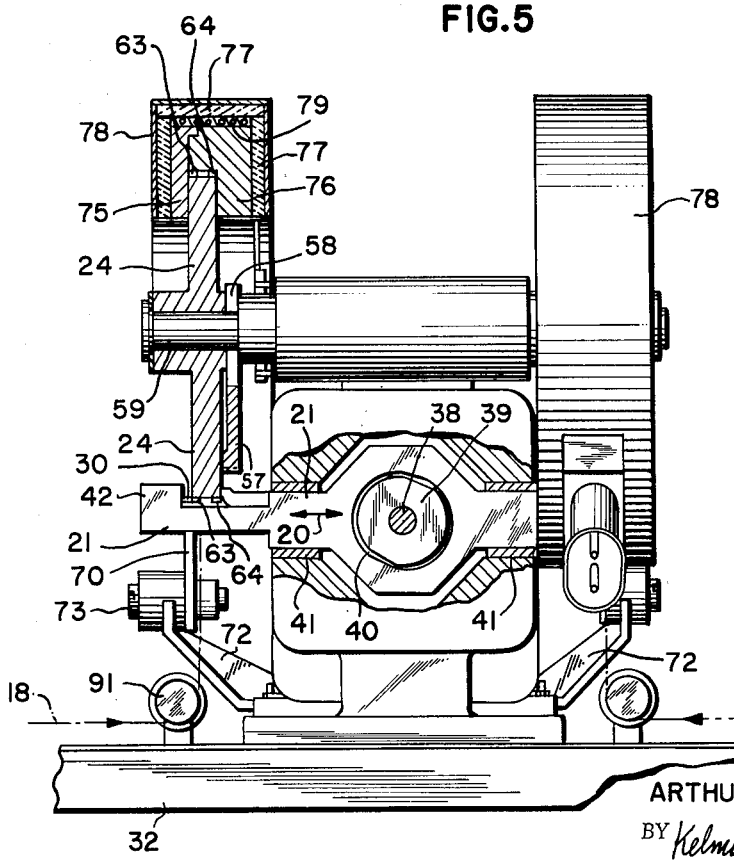
FIG. 5 is a fragmentary, partly sectional front view of the device of FIG. 3.

Wheels 24 are respectively mounted on the two ends of the upper transverse shaft 59 and are provided with two toothed rims each, as best seen from FIG. 5. A rim of shaping teeth 63 is instrumental in shaping the interlocking elements of the invention as will be more fully discussed in connection with FIGS. 1 and 2. A rim of ratchet teeth 64 cooperates with the pawl 61 and participates in one phase of the movement 62 of the feed arm 57, whereby the shaping wheel 24 is indexed or rotated in a stepwise manner. The pivoting movement of the pawl 61 is limited by stops 65 on both sides of the pawl 61 on the arm 57.

The afore-mentioned cam disk 55 on the shaft 45 rotates in a recess 67 of a two-armed lever 68. This lever is hingedly attached by a pin 69 to a support 70 and moves cyclically as shown by the arrows 71. The support 70 is pivoted on a bracket 72 by a pivot pin 73. The free end of the two-armed lever 68 carries a mandrel pin 27 which is fixed on the lever by two screws 74. The pin 27 moves closely adjacent the shaping teeth 63 of the wheel 24 in a direction outward of the gear box 33.

The peripheral portions of the wheels 24 arranged on both sides of the gear box 33 are guided in respective circular grooves formed by cooperating guides 75 and 76, which are surrounded by a layer 77 of insulating material. The layer 77 is surrounded by a ring-shaped sheet steel case 78 of U-shaped cross-section with the open side facing inward to allow the wheel 24 to enter. The case 78 extends over three quarters of the wheel periphery, as can be seen from FIG. 3. Between the insulating layer 77 and the guides 75, 76 there is mounted a heating element 79 which extends over the entire arcuate length of the case 78.

A stripper member 81 is located at the outlet end 80 of the sheet steel case 78 for separating the formed interlocking elements from the wheel 24. The stripper members 81 are arranged on both sides of the gear box 33. They are fixed to the gear box by a bracket 82 and a screw 83.

At the end of the gear box opposite the pulley 34, a feed wheel 84 is mounted on the afore-described shaft 53, and simultaneously advances the two fastener elements 85 which are delivered by stripper members 81 from both sides as indicated by dash-dotted lines. They are joined by a pull-up device 86, which is not described in detail, to form a closed zipper 87, and are discharged. The zipper then runs in the direction of the arrow 88 to a winding device not itself represented in the drawing. The winding device is driven by a chain drive of which only a sprocket 89 on the shaft 53 and a chain 90 are shown in FIG. 4. Threads or wire 18 are guided from both sides around a guide roll 91 to the part of the machine where the interlocking elements are formed, as can be seen from FIG. 5. The electric heating current for stabilizing the interlocking elements formed at the inlet end 92 of the case 78 is supplied from a junction box 93, which can be connected with a main, to the heating element 79 in the case 78.

The operation of the afore-described apparatus will next be described with reference to FIGS. 1 and 2.

FIGS. 1 and 2 show the shaping elements of the apparatus in a somewhat diagrammatic manner on a greatly enlarged scale. They respectively illustrate two forming steps. The reference plane 17 marked in FIG. 1 by a dotted line and shading corresponds to the common plane in which all members of the two zipper elements will normally be located when the zipper is assembled. This plane of reference is horizontal.

A plastic wire or thread 18 is continuously passed upward through a bore 19 in the thread guide 21, that moves to and fro in the direction of the arrow 20. After leaving the thread guide, the wire or thread is bent into the reference plane 17 or into a plane parallel thereto. This is done by means of the thread guide 21 which guides the thread through a gap 22 between the shaping teeth 63 of the wheel 24. The wheel is indexed in the direction of the arrow 23, whereby the leg 2 of a zipper member is formed.

As soon as the thread guide 21 has assumed the position shown in FIG. 1, the mandrel pin 27 starts its operation. The pin is movable perpendicularly to the thread guide and tangentially and radially relative to the wheel 24 in the respective directions of the arrows 25 and 26. The pin 27 enters a recess 28 of the thread guide in the direction of the arrow 25, then takes the thread along in an upward move out of the recess 28, whereupon the thread guide moves inward of the box 33 until it reaches the position shown in FIG. 2. The thread 18 is thereby wrapped around the mandrel pin 27 to form the bight of the head portion 29 of an interlocking member.

Simultaneously with the movement of the thread guide 21, a die 30 which is mounted on the thread guide moves toward the head portion 29 and flattens the head against the mandrel pin 27. The mandrel pin 27 then is retracted, and the wheel 24 is indexed forward by one tooth, whereby the thread is wrapped around the inner radially extending face of a shaping tooth. Thus a connecting piece 31 is formed between two members of the zipper element. The described procedure is repeated over and over, and a continuous interlocking element is formed automatically.

The interlocking element passes through a heating zone at the periphery of the wheel 24 for stress relief and heat setting while meshed with the shaping teeth. After cooling, it is removed from the wheel 24 and is then joined with a mating second element to form a zipper chain at the discharge end of the pull-up device 86.

It should be understood, of course, that the foregoing disclosure relates to only a preferred embodiment of the invention, and that it is intended to cover all changes and modifications of the example of the invention which do not constitute departures from the spirit and scope of the invention set forth in the appended claims.

What is claimed is:

1. Apparatus for producing an elongated interlocking element for zippers comprising, in combination, intermittent driving means; a tooth carrier intermittently driven by said driving means; a plurality of teeth spacedly aligned in a row on said carrier for movement through a forming station in a predetermined direction when said carrier is driven; wire guide means reciprocably movable transversely of said row through said forming station; mandrel means laterally adjacent said row of teeth and elongated in said direction, said mandrel means being reciprocable in said predetermined direction and in another direction transverse of said predetermined direction and of the direction of movement of said wire guide means toward and away from said station; and actuating means for actuating reciprocating movements of said wire guide means and of said mandrel means in timed sequence with the intermittently driven movement of said carrier for shaping said wire.

2. Apparatus as claimed in claim 1, wherein said carrier is a wheel, and said teeth constitute a rim on said wheel.

3. Apparatus as claimed in claim 2, further comprising a second wheel mounted on a common shaft with said carrier and supporting said wheels, said wire guide means and mandrel means constituting a set of bending tools, said apparatus further comprising a second set of bending tools, substantially identical with said first-mentioned set and cooperating with said second wheel for producing a second zipper element, and means for joining said elements, said second wheel, second tool set and said joining means being actuated by said actuating means in timed sequence.

4. Apparatus as described in claim 3, further comprising heating means enveloping a portion of said rim spaced from said station.

5. Apparatus as claimed in claim 1, further comprising a reciprocating die movable jointly with and parallel to said wire guide means for cooperation with said mandrel pin at said station, movement of said die being actuated by said actuating means.

6. Apparatus as described in claim 5, said die being mounted on said wire guide means.

References Cited by the Examiner

UNITED STATES PATENTS

| | | | |
|---|---|---|---|
| 2,389,055 | 11/1945 | Horton | 140—105 |
| 2,456,353 | 12/1948 | Wolf et al. | 140—105 XR |
| 2,547,356 | 4/1951 | Ames | 18—19 |
| 2,907,066 | 10/1959 | Wahl | 264—281 |
| 3,054,149 | 9/1962 | Streicher | 264—285 |
| 3,077,001 | 2/1963 | Yoshida | 18—19 |

FOREIGN PATENTS 805,631   5/1951   Germany.

WILLIAM J. STEPHENSON, *Primary Examiner.*

ROBERT F. WHITE, *Examiner.*